No. 672,333. Patented Apr. 16, 1901.
B. A. SLOCUM.
SHUTTER RELEASING DEVICE.
(Application filed Jan. 4, 1901.)
(No Model.)
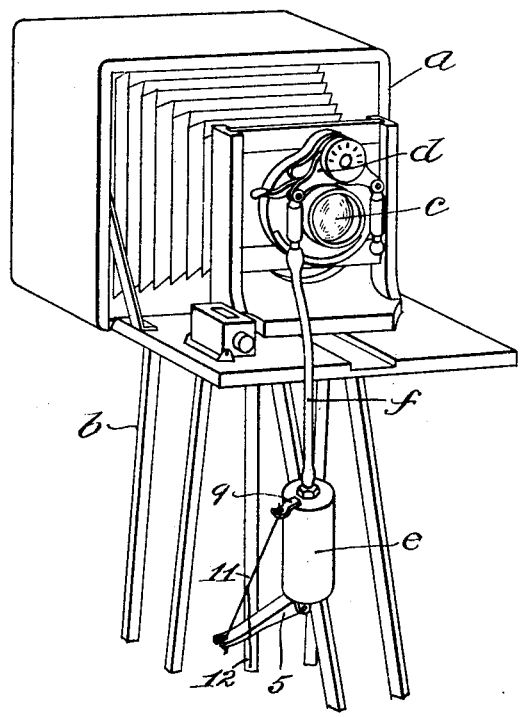
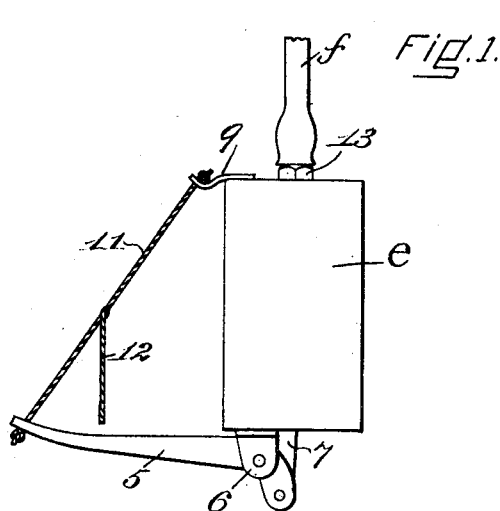
Fig. 2.
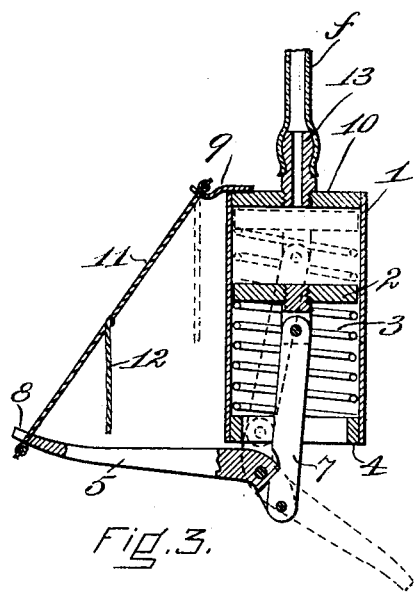
Fig. 3.
WITNESSES
Edward S. Day
Alfred H. Hildreth
INVENTOR
Benjamin A. Slocum
By his Attorney
Benjamin Philipp

UNITED STATES PATENT OFFICE.

BENJAMIN A. SLOCUM, OF LYNN, MASSACHUSETTS, ASSIGNOR OF TWO-THIRDS TO WILLIAM A. DUNBAR AND MINNIE M. DUNBAR, OF SAME PLACE.

SHUTTER-RELEASING DEVICE.

SPECIFICATION forming part of Letters Patent No. 672,333, dated April 16, 1901.

Application filed January 4, 1901. Serial No. 42,087. (No model.)

*To all whom it may concern:*

Be it known that I, BENJAMIN A. SLOCUM, a citizen of the United States, residing at Lynn, in the county of Essex and State of Massachusetts, have invented certain new and useful Improvements in Shutter-Releasing Devices; and I do hereby declare the following to be a full, clear, and exact description of the invention, such as will enable others skilled in the art to which it appertains to make and use the same.

The present invention relates to shutters for cameras, and more particularly to means for automatically operating the same.

The object of the present invention is to construct a device which shall automatically operate a camera-shutter.

To the above end the present invention consists in the device hereinafter to be described and claimed.

Camera-shutters as at present constructed are of two kinds—finger-actuated and bulb-actuated. By "finger-actuated" shutters I mean all shutters which are actuated by a button or lever pushed or moved by the finger of the operator. By "bulb-actuated" shutters I mean all shutters which are actuated by means of compressed air, a bulb in the hand of the operator being connected with the shutter mechanism by means of rubber tubing.

Heretofore it has often been desired by photographers to obtain pictures of themselves either alone or with others in a group; but, so far as I am aware, this has never been satisfactorily accomplished. With finger-actuated shutters it has been practically impossible, while with the bulb-actuated only by the use of a long tube leading from the shutter to the bulb in the hand of the operator could it be done. This was objectionable in that the rubber tube appeared in the picture and marred the effect thereof, and, furthermore, in that the extreme length of the tube, which was often necessary, made it difficult to obtain the requisite pressure at the shutter to operate the same.

The present invention contemplates, broadly, the use of any suitable shutter mechanism which is controlled by a time-fuse, so that the operator after lighting the fuse may assume the position desired and at almost any distance from the camera.

In the accompanying drawings I have shown my invention embodied in a device for use with bulb-actuated shutters; but my invention is not limited to any particular form of shutter, as it consists, broadly, in the use of a time-fuse for controlling any kind of shutter.

In the illustrated embodiment of my invention, Figure 1 is a perspective view of a camera provided with my improved shutter-operating device, Fig. 2 showing this device in side elevation, and Fig. 3 showing the same in section, the full lines denoting the position of the parts before the shutter has been operated and the dotted lines their position after it has been operated.

In the drawings the camera $a$ is supported on the tripod $b$ and provided with the lens $c$. The shutter $d$ is a well-known bulb-operated shutter. The shutter-operating device $e$ is connected with and suspended from the shutter by the rubber tube $f$. The said device consists of a cylinder 1 and a piston 2, arranged to reciprocate therein. A spring 3, engaging at one end the piston 2 and at the other the abutment-ring 4, acts to move the piston in the cylinder when it is released. The piston is normally held from movement and the spring 3 held compressed by means of a lever 5, pivotally mounted between the ears 6 on the abutment-ring 4. The shorter arm of the lever 5 is pivotally connected to the piston 2 by means of the link 7, while the end of the longer arm is slotted at 8. A short arm 9, fixedly secured to the head 10 of the cylinder, is also slotted in a similar manner. The lever 5 is normally held in the position shown in full lines by means of the string 11, which is knotted at both ends and provided near its middle with a slow-burning fuse 12. The head 10 of the cylinder is provided with the hollow nipple 13, over which the end of the rubber tube may be slipped in the usual manner.

The operation of my shutter-actuating device is as follows: The camera having been set up and focused, the shutter is set and the slide of the plate-holder withdrawn. The lever 5 of my device is rotated about its support, withdrawing the piston 2 from the head 10 of the cylinder 1 and compressing the spring 3. One end of a string 11 is inserted in the slot 8 at the end of lever 5 and the other end in the slot in the arm 9, the knots at each end holding the lever and piston in their normal or operative positions. The operator will then light the end of the fuse 12 and while it is burning take his position in front of the camera. When the spark reaches and burns through the string 11, the lever 5 will be released and the piston 2 forced against the head of the cylinder by the spring 3, compressing the air in the tube and operating the shutter.

Having thus described my invention, I claim as new and desire to secure by Letters Patent of the United States—

1. A shutter-releasing device, having, in combination, means for applying air to the shutter of a camera comprising a cylinder and a spring-actuated piston arranged to reciprocate in said cylinder, and a time-fuse controlling said means, substantially as described.

2. A shutter-releasing device, having, in combination, spring-actuated means for applying air to the shutter of a camera, and a time-fuse controlling said means, substantially as described.

3. A shutter-releasing device, consisting of means controlled by a time-fuse for applying air to the shutter of a camera, substantially as described.

In testimony whereof I affix my signature in presence of two witnesses.

BENJAMIN A. SLOCUM.

Witnesses:
CHARLES E. HAYWOOD,
ALFRED H. HILDRETH.